United States Patent [19]

Meverden et al.

[11] Patent Number: 5,266,627

[45] Date of Patent: Nov. 30, 1993

[54] HYDROLYZABLE SILANE COPOLYMER COMPOSITIONS RESISTANT TO PREMATURE CROSSLINKING AND PROCESS

[75] Inventors: Craig C. Meverden, Mason; Robert L. Silverman, Cincinnati, both of Ohio

[73] Assignee: Quantum Chemical Corporation, Cincinnati, Ohio

[21] Appl. No.: 914,375

[22] Filed: Jul. 15, 1992

Related U.S. Application Data

[63] Continuation-in-part of Ser. No. 660,765, Feb. 25, 1991, abandoned.

[51] Int. Cl.⁵ .................. C08L 43/04; C08K 3/22; C08K 5/09; C08F 230/08
[52] U.S. Cl. .................. 524/527; 524/436; 524/437; 524/398; 524/399; 524/284; 524/521; 524/547; 525/209; 526/279
[58] Field of Search ............... 524/521, 547, 284, 398, 524/399, 436, 437; 525/209; 526/279

[56] References Cited

U.S. PATENT DOCUMENTS

| | | | |
|---|---|---|---|
| 3,225,018 | 12/1965 | Zutty | 528/481 |
| 3,392,156 | 7/1968 | Donaldson | 526/227 |
| 3,646,155 | 2/1972 | Scott | 525/288 |
| 4,707,520 | 11/1987 | Keogh | 525/245 |
| 4,732,939 | 3/1988 | Hoshi et al. | 525/106 |

FOREIGN PATENT DOCUMENTS

| | | |
|---|---|---|
| 0149782A3 | 12/1984 | European Pat. Off. |
| 0169070 | 1/1986 | European Pat. Off. ............ 525/209 |
| 0245938 | 4/1987 | European Pat. Off. |
| 0365289 | 10/1989 | European Pat. Off. |
| 0370518A2 | 11/1989 | European Pat. Off. |

OTHER PUBLICATIONS

Samoilov, S. M., "Ethylene Radical Copolymerization with Vinyl Silanes," *Journal of Applied Polymer Science:* Applied Polymer Symposium, 36, 41-48 (1981); John Wiley & Sons, Inc.

*Primary Examiner*—Paul R. Michl
*Assistant Examiner*—Peter Szekely
*Attorney, Agent, or Firm*—Kenneth D. Tremain; Gerald A. Baracka

[57] ABSTRACT

Filled, pelletized silane copolymer compositions resistant to premature crosslinking during compounding and storage but which are readily hydrolyzed and undergo cure in the presence of silanol condensation catalyst are provided. The compositions comprise random copolymers of ethylene an vinyltriethoxysilane with relatively high levels of particulate fillers, such as carbon black, alumina trihydrate and the like, dispersed therein. The invention also relates to a method of crosslinking these compositions by combining the filled silane copolymer composition with a second component containing a silanol condensation.

14 Claims, No Drawings

HYDROLYZABLE SILANE COPOLYMER COMPOSITIONS RESISTANT TO PREMATURE CROSSLINKING AND PROCESS

CROSS-REFERENCE TO RELATED APPLICATIONS

This is a continuation-in-part of copending application Ser. No. 07/660,765, filed Feb. 25, 1991, now abandoned.

BACKGROUND OF THE INVENTION

1. Field of the Invention

This invention relates to ethylene and vinyltriethoxysilane random copolymers containing relatively high levels of particulate fillers which are resistant to premature crosslinking during processing and storage. It also relates to an improved method for producing crosslinked filled silane copolymer compositions whereby problems generally associated with processing such materials are minimized.

2. Description of the Prior Art

Crosslinking ethylene polymers to improve their mechanical strength, heat resistance and other properties is well known in the art. One method of crosslinking ethylene polymers involves incorporating alkoxysilane functionality into the polymer structure—either by grafting unsaturated alkoxysilanes onto ethylene polymers or by direct copolymerization of ethylene with unsaturated alkoxysilanes.

The alkoxysilane groups form crosslinks either by the action of heat and/or mechanical working or by hydrolysis/condensation reactions. Considering only the reaction of a single alkoxy group of a silane moiety the hydrolysis/condensation reaction would proceed according to the following schemes:

HYDROLYSIS:

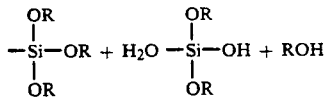

CONDENSATION:

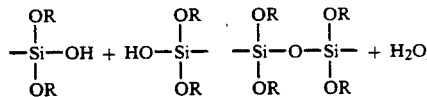

Crosslinkable ethylene polymers prepared by grafting unsaturated alkoxysilanes to ethylene polymers are disclosed in U.S. Pat. No. 3,646,155. Crosslinkable ethylene polymers prepared by copolymerizing ethylene with an unsaturated alkoxysilane are disclosed in U.S. Pat. Nos. 3,225,018 and 3,392,156.

One of the major limitations of crosslinking ethylene polymers which contain alkoxysilane functional groups is that incidental exposure to moisture can initiate the crosslinking reaction prematurely. Significant premature crosslinking can occur even in the absence of silanol condensation catalysts which are typically employed to facilitate the hydrolysis and condensation reactions. Premature crosslinking adversely affects (lowers) the melt index of the ethylene copolymer and, if this occurs to a significant degree, will result in poor processability and unsatisfactory extrudate surface appearance. In extreme cases, extrusion of the ethylene copolymer compositions becomes essentially impossible.

The problem of premature crosslinking is particularly troublesome with filled compositions since particulate fillers can contain substantial amounts of moisture. This moisture is released during the blending operation, batch or continuous, typically mixing on a mill, in a Banbury mixer, or in a compounding extruder at an elevated temperature, and hydrolyzes at least some of the alkoxy groups of the alkoxysilane. When the processing includes pelletization, as it does in most commercial operations, the problem is exacerbated by the extrusion/pelletization conditions required. Furthermore, with pelletized products there typically is additional exposure to water since most commercially practiced pelletization operations utilize water to cool/quench the molten resin. Hydrolysis and condensation will continue even after the mixing is completed as evidenced by a further deterioration of the physical properties of the filled composition upon storage and conveniently followed by monitoring the change in melt index. The problems associated with highly filled ethylene-vinylalkoxysilane copolymers are widely recognized throughout the industry and are described in European Patent Application 89310667.4 published Apr. 25, 1990.

Several solutions to the problem have been suggested in the prior art; however, none of the proposed solutions have resulted in a totally satisfactory commercial material and/or process to date. One method disclosed in the above-identified European Patent Application requires blending an ethylene-vinyltrialkoxysilane copolymer with a masterbatch containing a second polymer, the filler and silanol condensation catalyst immediately prior to extrusion. Even with this method it is recommended that the copolymer and masterbatch containing the filler be dried before extrusion. It further requires that if the compositions are to be stored, they be stored separately. It does not address or solve the problem of storage of ethylene-vinylalkoxysilane copolymers in combination with fillers.

Another method disclosed in U.S. Pat. No. 4,732,939 involves blending a non-crosslinkable organic polymer with the moisture crosslinkable ethylene polymer, filler and condensation catalyst. This lessens the effects of premature crosslinking and thus renders the filled blends processable by dilution of the crosslinkable polymer. Such dilution, however, limits the ability of these blends to achieve satisfactory levels of crosslinking.

Yet another method disclosed in Japanese Patent Applications 56,163,143, 59,217,750 and 62,184,707 requires that the filled moisture crosslinkable ethylene polymer system be extruded in the absence of condensation catalyst. The extruded product is subsequently immersed in a solution or emulsion of the catalyst. Such a process adds an additional step to the curing operation and makes the practice of moisture crosslinking quite cumbersome.

The addition of water scavengers to the filled moisture crosslinkable polymer systems to prevent crosslinking has also been suggested. Such methods are disclosed in U.S. Pat. No. 4,707,520 and European Patent Application 87302899.7 published Nov. 19, 1987.

SUMMARY OF THE INVENTION

It has now unexpectedly been found that relatively high levels of filler can be incorporated into certain very specific hydrolyzable silane copolymers and that the resulting compositions exhibit a desirable balance of good shelf stability and good processability. There is no significant premature crosslinking of these copolymers caused by absorbed water associated with the filler during processing when the filler is dispersed in the silane copolymer, pelletization, storage, or in the final processing when the filled copolymer is combined and intimately mixed with the silanol condensation catalyst and extended to obtain the final product. It is also unexpected and advantageous that these results are obtained without the use of any special drying procedures. Only after the filled copolymer is combined with the silanol condensation catalyst and exposed to water at elevated temperature does crosslinking occur at a reasonable rate.

The fact that ethylene-silane copolymers can be formulated with fillers and the filled pelletized products retained for subsequent use without a significant change in the physical properties as a result of incipient crosslinking is highly advantageous from the standpoint of the processor. Utilizing a silane copolymer composition already containing the filler eliminates the need for elaborate mixing equipment and removes a highly energy intensive and very often dirty mixing operation from the processor's facility, making it possible for the processor to significantly reduce his production costs. The possibility of formulating error is also significantly reduced since fewer ingredients need to be measured and combined.

More specifically, the improved compositions of the present invention are filled, pelletized hydrolyzable silane copolymer compositions resistant to crosslinking in the absence of a silanol condensation catalyst comprising:

(a) 30 to 99 weight percent of a random ethylene-vinyltriethoxysilane copolymer having a melt index from 0.1 to 50 and from 0.1 to 20 weight percent vinyltriethoxysilane copolymerized; and (b) 1 to 70 weight percent of a particulate filler; said composition retaining at least 70 percent of the original melt index when stored under ambient conditions for six months in the absence of silanol condensation catalyst but capable of being crosslinked by the action of water in the presence of a silanol condensation catalyst to a tensile strength greater than 1800 psi and elongation greater than 250 percent.

In another aspect of the invention, there is provided a process for preparing moisture crosslinked articles whereby premature crosslinking and the problems associated therewith during processing are minimized. The process comprises:

(1) combining (a) a hydrolyzable silane copolymer having particulate filler dispersed therein; said copolymer being a random ethylene-vinyltriethoxysilane copolymer having a melt index 0.1 to 50 and from 0.1 to 20 weight percent vinyltriethoxysilane copolymerized, said copolymer comprising from 30 to 99 weight percent of the composition and said particulate filler comprising from 1 to 70 weight percent of the composition and (b) a second component comprising an olefin polymer and 0.25 to 10 weight percent silanol condensation catalyst, based on the weight of the olefin polymer;

(2) processing the mixture of (a) and (b) to produce a homogeneous blend;

(3) extruding the mixture to form an extruded article; and (4) contacting the extruded article with moisture to effect crosslinking.

In a particularly advantageous embodiment, the filled hydrolyzable silane copolymer (a) and component (b) are in pellet form.

DETAILED DESCRIPTION OF THE INVENTION

This invention relates to filled moisture crosslinkable ethylene polymer and to the process for producing crosslinked compositions useful as insulation materials for electrical conductors and the like.

The significance of this invention lies in the fact that the ethylene-vinyltrialkoxysilane copolymers which are used can be loaded with high levels of particulate fillers, processed and pelletized and stored for prolonged periods without significant crosslinking. The products can then be further processed and formed into objects, by extrusion or the like, and crosslinked in the presence of water at elevated temperature. As a result of this invention, properties can now be imparted to moisture crosslinkable ethylene copolymer systems in ways which have not previously been feasible. For example, filled ethylene copolymers can now be made resistant to burning by the addition of substantial levels of hydrated mineral fillers and/or carbon black. It is also envisioned that processable reinforced composites can be produced using these ethylene copolymers.

In their most general terms, the compositions consist of a random copolymer of ethylene and vinyltriethoxysilane of the formula

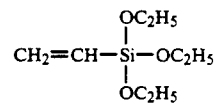

in admixture with a particulate filler material. Random copolymers of ethylene and vinyltrialkoxysilanes are known and the copolymers of this invention can be obtained by copolymerizing ethylene and vinyltriethoxysilane in accordance with any of the known procedures, such as those described in U.S. Pat. No. 3,225,018. Generally, the random copolymerization is at high pressure and temperature using a free radical initiator.

The amount of vinyltriethoxysilane incorporated into the random copolymer can range from 0.1 to 20 weight percent and, more preferably, is from 0.5 to 7.5 percent by weight. Quite surprisingly, polymers of ethylene grafted with comparable levels of vinyltriethoxysilane do not exhibit the same resistance to premature crosslinking in the presence of high filler loadings and are unacceptable for the practice of the present invention.

One or more olefinic monomers may also be present with the ethylene and vinyltriethoxysilane. α-Olefin comonomers are especially useful. When present, these comonomers may constitute up to 20 weight percent of the copolymer but are more preferably present in amounts less than 10 percent. Illustrative comonomers which can be copolymerized with the ethylene and vinyltriethoxysilane include: α-olefins such as propylene, butene, hexene and octene; vinyl esters such as vinyl acetate and vinyl butyrate; carboxylic acids and their esters such as methacrylic acid, acrylic acid, methyl acrylate, methyl methacrylate; vinyl ethers such as methyl vinyl ether; acrylonitrile; and the like. Alternatively, one or more non-silane crosslinkable resins may be present with the ethylene-vinyltriethoxysilane copolymer. These resins will be present in minor amounts and can include polyethylene, polypropylene, ethylene-propylene copolymer, ethylene-vinyl acetate copolymer, and the like.

The random copolymers utilized for the invention will generally have a melt index from about 0.1 to 50. It is particularly advantageous when the melt index of the ethylene-vinyltriethoxysilane copolymer is from 0.2 to 10. Formulations based on these latter type of materials find application as wire and cable coatings. Melt indexes referred to herein are determined in accordance with ASTM D 1238 and expressed in units of grams/10 minutes. It is an aspect of the invention to produce filled compositions resistant to premature crosslinking during processing, i.e., mixing with the particulate filler, extrusion and pelletization, and upon subsequent storage under ambient conditions for prolonged periods. The filled, pelletized compositions should retain at least about 70 percent of the original melt index when stored under ambient conditions for six months. It is especially advantageous if the retained melt index is 80 percent or more of the original melt index obtained for the filled silane copolymer composition. As employed herein ambient conditions indicate the usual conditions encountered at processing facilities with no special packaging requirements. Generally, the pelletized copolymer is stored in bags or boxes which have a conventional plastic liner of the non-barrier variety, e.g., low density polyethylene. The filled pellets can also be stored in bulk storage facilities such as railcars, silos, etc.

The random ethylene-vinyltriethoxysilane copolymer will comprise from about 30-99 weight percent of the composition and, more usually, from about 40 to 95 weight percent of the composition. The particulate filler will comprise from 1 to 70 weight percent and, more usually, from 5 to 60 weight percent of the composition.

Particulate fillers which can be utilized for the purpose of this invention and commonly used include any of the conventional fillers (sometimes referred to as reinforcing agents) known in the art. These agents are widely utilized to enhance polymer properties for specific applications and the type and amount of filler will be governed by the end use application of the formulated product. Examples of useful particulate fillers include carbon black, aluminum trihydrate, calcium carbonate, calcium silicate, magnesium carbonate, magnesium hydroxide, aluminum silicate, talc, silica, mica, gypsum, zeolite, kaolin, clays and the like. .Carbon black, aluminum trihydrate, and magnesium hydroxide are the most commonly used fillers for the present invention. It should be understood that mixtures of one or more of the above-mentioned particulate fillers can also be employed.

One or more stabilizer/antioxidants may be included with the ethylene-vinyltriethoxysilane copolymer and filler to protect the copolymer against the deleterious affects of heat, air and light during processing and subsequent storage. Antioxidants which can be employed are any of those generally utilized to stabilize ethylene polymers. The amount and type of antioxidant or stabilizer package will vary depending on the particular copolymer used, processing conditions and the intended application of the finished product. If desired, additional antioxidants of the same or different type may be added at the time the silanol condensation catalyst is added. Useful antioxidants generally include the hindered phenols, thio compounds and polymerized dihydroquinolines. Illustrative antioxidants include:tetrakis[methylene3-(3',5'-di-tertbutyl-4-hydrocinnamate)]methane, thiodiethylene bis-(3,5-ditert-butyl-4-hydroxy hydrocinnamate), n-octadecyl-$\beta$-(3,5-ditertbutyl-4-hydroxyphenyl)propionate, distearylthiodipropionate, dilaurylthiodipropionate, polymerized 1,2-dihydro-2,2,4-trimethylquinoline, and the like. The amount of antioxidant(s) can range from about 0.01 up to 1 weight percent of the filled composition.

The filler is incorporated (dispersed) in the silane copolymer utilizing conventional batch or continuous methods known to the art by mixing on a mill or in a mixer, such as a Banbury, Brabender or Henschel mixer, or in a continuous mixer, such as single or twin screw compounding extruders.

In a highly useful embodiment of the invention, the product obtained from the blending operation, i.e., the filled copolymer composition, is pelletized utilizing procedures known in the art. Pelletization provides uniformly sized pellets which are advantageously employed in commercial operations since they are essentially dust free and can be easily transported and fed into processing equipment. If the copolymer and filler are blended using an extruder, the pelletization can conveniently be accomplished in conjunction therewith by extruding the molten filled product through a suitable die and chopping the extrudate. Size of the pellets will vary depending on the size of the die holes, the extrusion rate and speed of the cutting blades. In one method of pelletization, referred to as strand pelletization, the extrudate is cooled, typically by passing through a water bath, to quench and solidify the polymer before it is chopped. In another procedure the molten extrudate is cut as it exits the die and the cut molten pellets are quenched/solidified to prevent reagglomeration. This latter procedure, referred to as die-face pelletization, commonly uses water to quench the molten cut pellets. Water-ring pelletization and underwater pelletization are two widely used methods to produce pellets in this manner. A description of pelletization procedures and the equipment employed can be found in the *Encyclopedia of Polymer Science and Engineering*, Vol. 10, pp. 802-810, J. Wiley & Sons (1987), the contents of which are incorporated herein by reference.

Utilizing the above-described random ethylene-vinyltriethoxysilane copolymers, it is possible to obtain storage stable filled products which can be retained for extended periods under ambient conditions without experiencing significant premature crosslinking. This is highly advantageous from the standpoint of the processor since the filled compositions can subsequently be combined with a silanol condensation catalyst and crosslinked upon exposure to moisture. The ability to have the filler already dispersed with the ethylene-vinyltriethoxysilane copolymer eliminates the need for energy intensive mixing by the processor. It is unexpected that the random ethylene-vinyltriethoxysilane copolymers can be employed in this manner since their grafted counterparts and random or grafted ethylene-vinyltrimethoxysilane copolymers have one or more deficiencies which preclude their use with similar processing. Either the copolymers are not stable in the presence of the filler, i.e., excessive premature crosslinking is observed during processing or when the filled copolymer is stored under ambient conditions, or the filled copolymer will crosslink excessively, i.e., scorch, during the subsequent processing and extrusion after the silanol condensation catalyst has been added.

To achieve crosslinking, the above-described compositions containing the filler, hydrolyzable ethylene-vinyltriethoxysilane copolymer and optional stabilizers/antioxidants, referred to herein as the first hydrolyzable silane copolymer component, is combined with a second composition containing a silanol condensation catalyst, and other additives if desired, and blended therewith using conventional processing equipment. The latter composition, referred to herein as the second component, is a blend of silanol condensation catalyst in an olefin homopolymer or copolymer which does not contain hydrolyzable alkoxysilane functionality. The second component may also contain other additives which are to be included in the final product.

The first and second components are intimately mixed to obtain a homogeneous blend and then extruded and contacted with moisture, preferably at an elevated temperature, to effect crosslinking. The mixing and extrusion can be carried out in a single operation, e.g., if the extruder has one or more mixing zones, or the two components can be blended in a mixer and subsequently fed to the extruder. These processing operations are greatly facilitated when one or both of these components are in pellet form. Pelletized products facilitate handling and feeding in continuous processing, such as in continuous wire coating operations. By selecting a carrier resin for the second component which has good processing characteristics and which is highly compatible with the silane copolymer, the blending operation is further greatly facilitated. An important feature of the present invention is that significant crosslinking which can make the formulation difficult or impossible to extrude and which can produce unacceptable extrudate surface appearance is minimized or virtually eliminated by this process.

The second component will contain from about 0.25 to about 10 weight percent silanol condensation catalyst based on the weight of the olefin polymer. Especially useful compositions are obtained when the amount of silanol condensation catalyst ranges from about 0.5 to about 5 weight percent. The olefin homopolymer or copolymer serves as a carrier for the silanol condensation catalyst and facilitates addition to and blending with the filled ethylene-vinyltriethoxysilane copolymer component. In general, any homopolymer or copolymer can be used which is compatible with the ethylene-vinyltriethoxysilane copolymer and which does not contain any alkoxysilane groups which are hydrolyzable under the prevailing conditions. These are primarily homopolymers and copolymers of ethylene such as low density polyethylene, linear low density polyethylene and high density polyethylene; propylene homopolymers and copolymers such as polypropylene and ethylenepropylene copolymers (random and block); and copolymers of ethylene with vinyl acetate, ethyl acrylate, methyl acrylate and the like. Mixtures of two or more of these polymers can also be effectively used. The melt index of the olefin homopolymer/copolymer carrier resin can be higher than, lower than or substantially the same as the melt index of the ethylene-vinyltriethoxysilane copolymer. The selection of the carrier resin can be made such that the rheological/physical properties of the final formulation are optimized.

The amount of the second component added to the first component is sufficient to introduce an amount of silanol condensation catalyst to bring about the cure. This will vary depending on the amount of vinyl triethoxysilane copolymerized and the amount of silanol condensation catalyst present with the carrier resin of the second component. Most generally, the hydrolyzable silane copolymer component will comprise from 70 to 99 weight percent of the blend and the second component will constitute from 1 to 30 weight percent of the blend. Formulations obtained using from 85 to 95 weight percent of the filled silane component and 5 to 15 weight percent of the second component containing the silanol condensation catalyst and other additives are particularly advantageous.

Silanol condensation catalysts are known in the art for crosslinking alkoxysilane polymers and can be employed for the present invention. These catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylates, especially dibutyltindilaurate and dioctyltinmaleate, are particularly effective for this invention.

The compositions of this invention can contain other additives conventionally employed in formulations of this type. Such additives are known in the art and are generally present in such amounts cumulatively not exceeding 15 percent by weight, based on the total composition. Such additives include antioxidants, UV stabilizers, release agents, processing aids, nucleating agents, colorants, pigments, metal deactivators, lubricants, other polymers, and the like. While these additives can be incorporated into either component, it is convenient to prepare a masterbatch of the additives with the silanol condensation catalyst in the carrier resin. While the first component will contain the bulk of the filler, additional filler of the same or different type can be combined with the carrier resin and silanol condensation catalyst.

The invention is more fully illustrated by the following examples. All parts and percentages referred to in the examples are given in a weight basis unless otherwise indicated. Cure data presented in the examples was determined by measuring the torque (lb-in) on 75 mil compression molded plaques with a Monsanto Oscillating Disc Rheometer (ODR) operating at 360° F. and +/−5° arc. Samples were cured by immersing in a 95° C. water bath for a specified period of time. High ODR torque values indicate increased levels of crosslinking.

EXAMPLE I

An ethylene-vinyltriethoxysilane (EVTEOS) random copolymer having a melt index of 5 with 4.1% vinyltriethoxysilane copolymerized was compounded with carbon black in a Banbury mixer. The compounded copolymer (identified as IA) contained 73.65% ethylene-vinyltriethoxysilane copolymer, 26.0% ASTM grade N990 carbon black, and 0.35% antioxidant (polymerized 1,2-dihydro-2,2,4-trimethylquinoline). A composition (identified as IB) containing 79.7% low density polyethylene (melt index 2.2), 17.5% ASTM grade N110 carbon black, 1.4% dibutyltindilaurate and 1.4% antioxidant (Irganox ® 1010) was also prepared. The filled vinyltriethoxysilane copolymer composition IA (92.5 parts) was combined with 7.5 parts IB in a Brabender Plasticorder to obtain a homogeneous blend (identified as IC). This product is readily extrudable onto wire to provide a tough durable insulation coating after crosslinking by exposing to moisture.

Compression molded plaques of IA, IB, and IC were prepared and the torque determined. Specimens of IC were also cured in water for 8 hours and 24 hours. Cure data obtained were as follows:

| Sample | Torque (lb-in) |
|---|---|
| IA | 1.5 |
| IB | 2 |
| IC (uncured) | 3 |
| IC (8 hr. cure) | 20 |
| IC (24 hr. cure) | 22.5 |

Based on the low torque values observed for IA and IC (uncured) it is apparent that very little crosslinking occurs during mixing of the ethylene-vinyltriethoxysilane copolymer and the filler or during processing of the filled ethylene-vinyltriethoxysilane copolymer with composition IB containing the silanol condensation catalyst. High levels of crosslinking are achieved for IC, however, upon moisture cure for 8 and 24 hours as evidenced by the high torque values obtained.

To demonstrate the ability of the filled EVTEOS copolymer compositions to resist incipient crosslinking, product IB was pelletized and the pellets were stored under ambient conditions in a liner-grade polyethylene plastic bag for 23 weeks. The melt index of the composition at the beginning of the storage period was 0.67 and after 23 weeks storage the melt index was 0.57. This represents only a 15% decrease in melt index which is considered to be within acceptable processing limits.

EXAMPLE II

To demonstrate the versatility of the invention, Example I was repeated except that a different ethylene-vinyltriethoxysilane copolymer was used and the amount of the second component containing the silanol condensation catalyst was varied. The EVTEOS copolymer used for the formulation had a melt index of 5 and contained 1.9% copolymerized vinyltriethoxysilane. Eighty-five parts of the filled copolymer were combined with 15 parts of the composition containing the silanol condensation catalyst to produce the moisture crosslinkable composition. Torque values were obtained for each of the components used to obtain the composition and for the resulting formulation before and after cure. Results were as follows:

| Sample | Torque (lb-in) |
|---|---|
| EVTEOS Copolymer | 1.5 |
| Filled EVTEOS Copolymer | 2 |
| Filled EVTEOS Copolymer + Second Component: | |
| Uncured | 3 |
| Cured 8 hours | 16 |
| Cured 24 hours | 23 |

The melt index of the filled ethylene-vinyltriethoxysilane copolymer was 1.23. After storage for 23 weeks, the melt index was 1.04—a decrease of only 15.4% which is considered to be within acceptable limits.

To further illustrate the resistance of the filled ethylene-vinyltriethoxysilane copolymers to hydrolysis and crosslinking they were subjected to an even more stringent test. In this test a compression molded 75 ml plaque of the filled copolymer (73.7 parts copolymer, 26.0 parts carbon black and 0.3 parts antioxidant) was immersed in a 95° C. water bath for 24 hours. The torque of the test specimen only increased from 2 lb-in to 3.5 lb-in upon such exposure. This clearly demonstrates the superior resistance to crosslinking obtained with the filled compositions of this invention in the absence of silanol condensation catalyst.

EXAMPLE III

A carbon black filled formulation prepared using a mixture of ethylene-vinyltriethoxysilane copolymer (MI=5; 4.1% VTEOS) and ethylene-vinyl acetate (EVA) copolymer (MI=2.2; 19% VA) was combined with a second component comprised of 92% EVA, 4% dibutyltindilaurate and 4% Irganox ® 1010. The fully formulated crosslinkable composition was comprised as follows:

|  | PARTS |
|---|---|
| EVTEOS copolymer | 54.5% |
| EVA copolymer | 19.5% |
| Carbon Black (ASTM N990) | 21.0% |
| Second component | 5.0% |

The uncured formulation had an ODR torque value of 5.5 lb-in. After immersing in a 95° C. water bath for 8 and 24 hours, the torque values were 20 and 26 lb-in, respectively, indicating the presence of a substantial amount of crosslinking.

EXAMPLES IV-IX

Moisture crosslinkable formulations were prepared utilizing a variety of different fillers. The compositions were prepared by first dispersing the filler in the EVTEOS copolymer and then blending the filled copolymer composition with a second component containing the silanol condensation catalyst in a Brabender Plasticorder mixer. The EVTEOS copolymer used for these formulations had a melt index of 5 and contained 4.1% copolymerized vinyltriethoxysilane. The second component used was the same as employed in Example I. Compositional details and ODR torque values are reported in Table I. N.D. in the table signifies that the value was not determined.

It can be seen from the data that a variety of fillers can be mixed into EVTEOS copolymers without inducing significant crosslinking during processing even in the presence of a silanol condensation catalyst. It is further apparent from the data that while the amount of premature crosslinking obtained during compounding and processing is slightly higher than that obtained with the formulations of Examples I-III containing carbon black alone, sufficient silanol functionality remains to effect a high degree of crosslinking upon subsequent moisture cure. To further illustrate the utility of these formulations, the melt index of the product of Example IV which utilized alumina trihydrate as the filler was monitored to determine its storage stability. The initial melt index of the filled EVTEOS product was 2.06. After 24 weeks storage under ambient conditions the melt index increased to only 2.35.

TABLE I

|  | EXAMPLES | | | | | |
|---|---|---|---|---|---|---|
|  | IV | V | VI | VII | VIII | IX |
| EVTEOS Copolymer | 59.5 | 59.5 | 59.5 | 59.5 | 59.5 | 59.5 |
| Alumina Trihydrate | 25.5 | — | — | — | — | — |

TABLE I-continued

|  | EXAMPLES | | | | | |
| --- | --- | --- | --- | --- | --- | --- |
|  | IV | V | VI | VII | VIII | IX |
| Talc | — | 25.5 | — | — | — | — |
| Magnesium Carbonate | — | — | 25.5 | — | — | — |
| Burgess KE Clay | — | — | — | 25.5 | — | — |
| Wollastonite | — | — | — | — | 25.5 | — |
| Mica | — | — | — | — | — | 25.5 |
| Carbon Black (ASTM N110) | 2.6 | 2.6 | 2.6 | 2.6 | 2.6 | 2.6 |
| Dibutyltindilaurate | 0.2 | 0.2 | 0.2 | 0.2 | 0.2 | 0.2 |
| Irganox ® 1010 | 0.2 | 0.2 | 0.2 | 0.2 | 0.2 | 0.2 |
| Low Density Polyethylene | 12.0 | 12.0 | 12.0 | 12.0 | 12.0 | 12.0 |
| Torque Values (lb-in): | | | | | | |
| EVTEOS | 1.5 | 1.5 | 1.5 | 1.5 | 1.5 | 1.5 |
| EVTEOS + filler | 2 | N.D. | N.D. | N.D. | N.D. | N.D. |
| Formulated Product: | | | | | | |
| Uncured | 11 | 5 | 8.5 | 8.5 | 8.5 | 7 |
| 8 Hour Cure | 20 | 24.5 | N.D. | N.D. | N.D. | N.D. |
| 16 Hour Cure | 25 | N.D. | 28 | 34 | 33.5 | 35 |
| 24 Hour Cure | N.D. | 32.5 | N.D. | N.D. | N.D. | N.D. |

EXAMPLES I-III

The unexpected hydrolytic stability of filled random EVTEOS copolymer compositions is demonstrated by the following comparative examples wherein filled compositions based on grafted EVTEOS polymers were prepared and evaluated. The copolymers employed for these comparative examples were obtained by grafting vinyltriethoxysilane onto polyethylene in accordance with the general procedure described in U.S. Pat. No. 3,646,155. The formulated products were prepared by first dispersing the filler in the EVTEOS graft copolymer and then blending 85 parts of the resulting filled copolymer composition with 15 parts of a second component containing the silanol condensation catalyst. The mixing procedures and second component were the same as described for Example I. Formulations are set forth in the table which follows along with the ODR torque values obtained for the uncured and cured composition.

|  | COMPARATIVE EXAMPLES | | |
| --- | --- | --- | --- |
|  | I | II | III |
| EVTEOS graft copolymer | 59.5[1] | 59.5[2] | 59.5[3] |
| Alumina trihydrate | 25.5 | 25.5 | 25.5 |
| Carbon Black (ASTM N110) | 2.6 | 2.6 | 2.6 |
| Dibutyltindilaurate | 0.2 | 0.2 | 0.2 |
| Irganox ® 1010 | 0.2 | 0.2 | 0.2 |
| Low Density Polyethylene | 12.0 | 12.0 | 12.0 |
| Torque Values (lb-in): | | | |
| Uncured | 1 | 2.5 | 12 |
| 16 Hour Cure | 11 | 16 | 28 |

[1] MI = 1.0; 1.2% grafted VTEOS
[2] MI = 0.2; 1.2% grafted VTEOS
[3] MI = <0.1; 1.7% grafted VTEOS It is apparent from the above data that unacceptably low levels of cure are obtained after 16 hours for Comparative products I and II formulated using the graft copolymer. For example, the product of Example II similarly formulated using a copolymer having a similar amount of VTEOS randomly polymerized achieved the same level of cure in only half the time. While the 16 hour cure obtained for the Comparative product III was acceptable, the product was difficult to extrude and had unacceptable surface appearance. Also, considering the graft copolymer contained only 1.7% VTEOS, the composition underwent a high degree of crosslinking during processing of the filled copolymer composition with the second component.

COMPARATIVE EXAMPLES IV AND V

To further demonstrate the unacceptability of closely related compositions, ethylene-vinyltrimethoxysilane (EVTMOS) copolymers prepared both by random copolymerization of ethylene and vinyltrimethoxysilane (VTMOS) and by grafting the VTMOS onto polyethylene were evaluated. The methods employed to prepare these copolymers were the same as utilized for the EVTEOS. The EVTMOS random copolymer used had a melt index of 0.6 and contained 2.1% copolymerized VTMOS. The EVTMOS graft copolymer had a melt index of 0.5 and had 16% VTMOS grafted. Formulated products were prepared using the EVTMOS copolymers in accordance with the procedure of this invention by first dispersing the filler (alumina trihydrate) in the copolymer and then subsequently blending the resulting filled copolymer composition (85 parts) with 15 parts of a second component containing the silanol condensation catalyst. The second component was the same as employed in Example I. The formulations and ODR torque values are set forth in the table which follows.

|  | COMPARATIVE EXAMPLES | |
| --- | --- | --- |
|  | IV | V |
| EVTMOS graft copolymer | 59.5 | — |
| EVTMOS random copolymer | — | 59.5 |
| Alumina Trihydrate | 25.5 | 25.5 |
| Carbon Black (ASTM N110) | 2.6 | 2.6 |
| Dibutyltindilaurate | 0.2 | 0.2 |
| Irganox ® 1010 | 0.2 | 0.2 |
| Low Density Polyethylene | 12.0 | 12.0 |
| Torque Values (lb-in): | | |
| Uncured | 47 | 28 |
| 8 Hour Cure | N.D. | 45 |
| 16 Hour Cure | N.D. | N.D. |
| 24 Hour Cure | 39 | 48 |

It is apparent from the above data that the formulation prepared using the EVTMOS graft copolymer and the formulation prepared using EVTMOS random copolymer became highly crosslinked during processing of the filled copolymer with the silanol condensation catalyst. In fact, the product of Comparative Example IV was completely or essentially completely cured during this processing. The decrease in torque observed after 24 hour cure for this sample is believed to be due to excessive embrittlement of the sample resulting from the high degree of crosslinking. While additional water cure was achieved with Comparative Product V upon exposure to moisture, the high level of premature crosslinking would make the composition virtually impossible to extrude at an acceptable rate while maintaining acceptable extrudate quality.

EXAMPLE X

Two talc filled, pelletized products were prepared in accordance with the invention using two different random EVTEOS copolymers. The first EVTEOS copolymer had 3.0% VTEOS copolymerized, a melt index of 1 and density of 0.920. The second random EVTEOS copolymer of had 2.2% VTEOS copolymerized, a melt index of 1 and density of 0.920.

Products were prepared by dispersing 50 grams talc in 200 grams of each of the random EVTEOS copolymers. A 240 cc Brabender Prep-Mixer set at 130° C. and 60 rpm with a nitrogen purge and air cooling was used for the mixing. No processing problems were encountered for either formulation and batch drop temperatures after 5 minutes mixing were about 160° C.

The products were cooled, granulated through a ¼ inch screen and then extruded and pelletized. A single screw extruder was used. The extruder had 4 heating zones, a ¾ inch diameter screw operated at 60 rpm and a single strand die. Temperatures in the heating zones were as follows: $Z_1$ 305°–306° F.; $Z_2$ 315°–319° F.; $Z_3$ 324°–330° F. and $Z_4$ 339°–342° F. The extrudate was fed into a water bath to quench the melt and then pelletized. No processing problems were encountered during the extrusion and pelletization of either product.

To further demonstrate the stability of the filled EVTEOS copolymers and resistance to moisture cure in the absence of silanol condensation catalysts, both pelletized products were soaked in water at ambient temperature for 24 hours and reprocessed. Reprocessing conditions were identical to those used for the original extrusion and pelletization. There were no observable differences in the processability of the products exposed to water for 24 hours and the originally processed products and extrudate quality was comparable.

Eighty-five parts of each of the above-prepared pelletized products were then combined with 15 parts of a pelletized composition comprised of 96.5 parts low density polyethylene, 2.1 parts antioxidant and 1.4 parts dibutyltindilaurate. The mixtures were extruded using the previously described conditions. No processing problems were encountered and no scorching of the extrudate was apparent even under 50× magnification. The smooth surface indicates the absence of unacceptable premature crosslinking. The products containing the silanol condensation catalyst readily crosslink upon exposure to water and the resulting crosslinked materials have tensile and elongation values acceptable for wire and cable applications. Typically, tensile strengths of at least 1800 psi and elongations greater than 250% are achieved upon cure. The extent of cure can be measured by determining the percent gel in accordance with ASTM D-2765, Method C.

EXAMPLE XI

Moisture crosslinkable compositions suitable for use as wire insulation were prepared in accordance with the invention using a pelletized filled EVTEOS composition which had been stored under ambient conditions. The pelletized product was comprised of 64% random EVTEOS (2.2% VTEOS; melt index 1; density 0.920), 17% EVA copolymer (18% VA, melt index 2.5), 18.7% ASTM N990 carbon black and 0.3 antioxidant. The pelletized products were prepared by blending the ingredients in a Banbury mixer and then extruding. A single screw extruder with an underwater pelletizer was employed for the extrusion/pelletization. The recovered pellets were stored in standard containers under ambient conditions and evaluated for moisture curability after 50 and 105 days. The containers used were cardboard boxes with standard polyethylene liners. To evaluate cross-linking, 92.5 parts of each of the pelletized EVTEOS compositions was combined with 7.5 parts of a second component comprised of 78.3% low density polyethylene (melt index 0.18, density 0.918), 17% ASTM N110 carbon black, 1.4% dibutyltindilaurate and 2.8% antioxidant. Mixing was carried out in a Brabender mixer in accordance with the procedure described in Example X and tensile, elongation and hot creep were measured after 16 hours moisture cure (immersion in 95° C. water). Product A is the composition prepared using the filled EVTEOS composition which had been stored for 50 days and Product B is the material obtained using the EVTEOS composition which was stored for 105 days.

Tensile and elongation values were determined in accordance with ASTM D-638. Hot creep was determined in accordance with the test method of the Insulated Cable Engineers Inc., Publication T-28-562, (March, 1981, revised January, 1983). This procedure provides a convenient method for determining the relative degree of crosslinking of polymeric electrical cable insulation. For the test, a suspended specimen is subjected to a constant load stress in an air oven at an elevated temperature for a period of time. At the end of the specified time period, the increase in elongation of the specimen is determined. Results obtained for the two compositions were as follows:

|  | Product A | Product B |
|---|---|---|
| Tensile Strength (psi) | 2000 | 1953 |
| Elongation (%) | 328 | 330 |
| Hot Creep (%) | 40 | 70 |

The hot creep values indicate an acceptable crosslinkable moisture cure and the elongation values greater than 300% indicate the absence of significant premature crosslinked particles. Thus, the data indicate the products, obtained using a filled, pelletized EVTEOS copolymer which had been stored for a considerable period, were extruded without generating premature crosslinking and the extrudate crosslinked as required during the water cure process step.

EXAMPLE XII

The ability to extrude and moisture cure electrical cable insulation is illustrated by the following example wherein 85 parts of the pelletized filled EVTEOS composition of Example XI which had been stored in standard non-waterproof containers for 158 days was combined with 15 parts of the second component of Example XI, blended and extruded on 14 AWG copper wire on a high speed wire extrusion line operating at a line speed of 200 ft/min. The thickness of the insulation coating was 30 mil. No problems were encountered during extrusion. The extrudate was cured in a 95° C. water bath for 16 hours. The resulting cured product had a tensile strength of 2084 psi, elongation of 242% and hot creep of 66%.

We claim:

1. A filled, pelletized hydrolyzable silane copolymer composition consisting essentially of:
   (a) 40 to 95 weight percent of a random ethylene-vinyltriethoxysilane copolymer having a melt index from 0.1 to 50 and from 0.1 to 20 weight percent vinyltriethoxysilane copolymerized; and
   (b) 5 to 60 weight percent of a particulate filler selected from the group consisting of carbon black, aluminum trihydrate, magnesium hydroxide and mixtures thereof; said composition retaining at least 70 percent of the original melt index upon storage under ambient conditions for six months in the absence of silanol condensation catalyst but capable of being crosslinked by the action of water in the presence of a silanol condensation catalyst to a tensile strength greater than 1800 psi and elongation greater than 250 percent.

2. The composition of claim 1 which contains 0.001 to 1 weight percent antioxidant.

3. The composition of claim 1 wherein the ethylene-vinyltriethoxysilane copolymer has a melt index from 0.2 to 10 and contains from 0.5 to 7.5 weight percent copolymerized vinyltriethoxysilane.

4. The composition of claim 3 which contains 0.001 to 1 weight percent antioxidant selected from the group consisting of tetrakis[methylene 3-(3′,5′-di-tertbutyl-4-hydrocinnamate)]methane, thiodiethylene bis-(3,5-ditertbutyl-4-hydroxyhydrocinnamate), n-octadecyl-$\beta$-(3,5-ditertbutyl-4-hydroxyphenyl)propionate, distearylthiodipropionate, dilaurylthiodipropionate, and polymerized 1,2-dihydro-2,2,4-trimethylquinoline.

5. A process for preparing a moisture crosslinked article whereby premature crosslinking and the problems associated therewith during processing are minimized, comprising:
(1) combining (a) a filled, pelletized composition comprised of 40 to 95 weight percent of a hydrolyzable random ethylene-vinyltriethoxysilane copolymer having a melt index from 0.1 to 50 and from 0.1 to 20 weight percent vinyltriethoxysilane copolymerized, and 5 to 60 weight percent of a particulate filler selected from the group consisting of carbon black, aluminum trihydrate, magnesium hydroxide and mixtures thereof and (b) a second pelletized composition comprising an olefin polymer and 0.25 to 10 weight percent silanol condensation catalyst based on the weight of the olefin polymer;
(2) processing the mixture of (a) and (b) to produce a homogeneous blend;
(3) extruding the homogeneous blend to form an extruded article; and
(4) contacting the extruded article with moisture to effect crosslinking.

6. The process of claim 5 wherein the ethylene-vinyltriethoxysilane copolymer contains from 0.5 to 7.5 weight percent copolymerized vinyltriethoxysilane and has a melt index of 0.2 to 10.

7. The process of claim 6 wherein the silanol condensation catalyst is selected from the group consisting of organic bases, carboxylic acids, organic titanates, and complexes or carboxylates of lead, cobalt, iron, nickel, zinc and tin.

8. The process of claim 7 wherein the olefin polymer is a homopolymer or copolymer of ethylene or propylene.

9. The process of claim 8 wherein the olefin polymer is polyethylene.

10. The process of claim 8 wherein the olefin polymer is an ethylene-vinyl acetate copolymer.

11. The process of claim 7 wherein the silanol condensation catalyst is a dialkyl tin carboxylate and constitutes from 0.5 to 5 weight percent of said second pelletized composition.

12. The process of claim 11 wherein the second pelletized composition comprises 1 to 30 weight percent of the mixture.

13. The process of claim 11 wherein the homogeneous mixture obtained from step (2) is extruded onto an electric conductor.

14. The process of claim 11 wherein step (4) is conducted at 95° C.

* * * * *

UNITED STATES PATENT AND TRADEMARK OFFICE
CERTIFICATE OF CORRECTION

PATENT NO. : 5,266,627
DATED : November 30, 1993
INVENTOR(S) : Craig C. Meverden, et al It is certified that error appears in the above-indentified patent and that said Letters Patent is hereby corrected as shown below:

On the cover page in the Abstract, line 6, "an" should read --and--; last line, "silanol condensation." should read --silanol condensation catalyst.--

Column 1, lines 40-44, after "$H_2O$", should be inserted -- 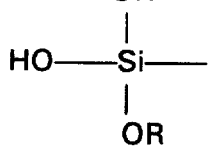 --; lines 49-50, after $$\begin{array}{c} \text{OR} \\ | \\ \text{HO}—\text{Si}— \\ | \\ \text{OR} \end{array}$$

should be inserted -- 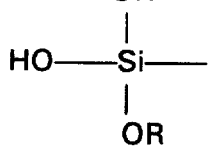 -- .

Column 12, line 15, "16%" should read --1.6%--.
Column 15, line 3:
Claim 2, line 1, "0.001" should read --0.01--.
Column 15, line 9:
Claim 4, line 1, "0.001" should read --0.01--.

Signed and Sealed this

Twenty-sixth Day of July, 1994

Attest:

BRUCE LEHMAN

*Attesting Officer*  *Commissioner of Patents and Trademarks*